(12) United States Patent
Tomic et al.

(10) Patent No.: US 9,512,292 B2
(45) Date of Patent: *Dec. 6, 2016

(54) FUEL PART AND PROCESS FOR PREPARATION OF A FUEL PART

(75) Inventors: Katarina Tomic, Echt (NL); Konraad Dullaert, Echt (NL); Eric Willem Van Der Vegte, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/812,314

(22) PCT Filed: Jul. 21, 2011

(86) PCT No.: PCT/EP2011/062546
§ 371 (c)(1),
(2), (4) Date: Jul. 8, 2013

(87) PCT Pub. No.: WO2012/013569
PCT Pub. Date: Feb. 2, 2012

(65) Prior Publication Data
US 2013/0281599 A1  Oct. 24, 2013

(30) Foreign Application Priority Data
Jul. 26, 2010 (EP) .................. 10170791

(51) Int. Cl.
| | | |
|---|---|---|
| C08K 3/34 | (2006.01) | |
| B60K 15/03 | (2006.01) | |
| C08L 77/02 | (2006.01) | |
| C08L 77/06 | (2006.01) | |
| B29C 49/00 | (2006.01) | |
| C08K 3/00 | (2006.01) | |
| C08K 7/14 | (2006.01) | |

(52) U.S. Cl.
CPC ............ *C08K 3/34* (2013.01); *B29C 49/0005* (2013.01); *B60K 15/03177* (2013.01); *C08L 77/02* (2013.01); *C08L 77/06* (2013.01); *B60K 2015/03493* (2013.01); *C08K 3/0033* (2013.01); *C08K 7/14* (2013.01); *C08L 2205/02* (2013.01)

(58) Field of Classification Search
CPC ........ C08K 3/34; C08L 77/06; B29C 49/0005; B60K 15/03006; B60K 15/03177
USPC ...................................................... 524/451
See application file for complete search history.

(56) References Cited

U.S. PATENT DOCUMENTS

| | | |
|---|---|---|
| 2004/0167268 A1 * | 8/2004 | Vathauer et al. ............. 524/445 |
| 2009/0085019 A1 | 4/2009 | Buhler et al. |
| 2009/0305016 A1 | 12/2009 | Miyoshi et al. |
| 2010/0173139 A1 | 7/2010 | Miyoshi et al. |
| 2010/0324195 A1 | 12/2010 | Williamson |
| 2011/0014486 A1 * | 1/2011 | Sakamoto et al. ......... 428/474.4 |
| 2011/0229672 A1 | 9/2011 | Hoffmann et al. |
| 2013/0261245 A1 * | 10/2013 | Tomic et al. ................. 524/451 |
| 2014/0034654 A1 * | 2/2014 | Dullaert et al. ............. 220/586 |

FOREIGN PATENT DOCUMENTS

| | | |
|---|---|---|
| CA | 2714060 | 8/2013 |
| CN | 101309971 | 11/2008 |
| CN | 101328313 | 12/2008 |
| EP | 1 950 248 | 7/2008 |
| EP | 2 154 203 | 2/2010 |
| GB | 1 284 489 | 8/1972 |
| JP | 2000-273167 | 10/2000 |
| JP | 2003119376 A * | 4/2003 |
| JP | 2006-008160 | 1/2006 |
| JP | 2007154110 A * | 6/2007 |
| JP | 2010-512422 | 4/2010 |
| JP | 2010-111730 | 5/2010 |
| JP | 2011-26417 | 2/2011 |
| WO | WO 2009119759 A1 * | 10/2009 |
| WO | WO2011-033035 | 3/2011 |

OTHER PUBLICATIONS

Machine translation of JP 2003-119376, Apr. 23, 2003.*
A.V. Shenoy et al., "Rheograms of Filled Polymer Melts from Melt-Flow Index", Polymer Composites, vol. 4, No. 1, Jan. 1983, pp. 53-63.
Chenar et al, "The effect of water vapor on the performance of commercial polyphenylene oxide and Cardo-type polyimide hollow fiber membranes in CO2/CH4 separation applications", Journal of Membrane Science, 285 (2006) 265-271.
PPO™ Resin 646, Americas: Commercial, Saudi Basic Industries Corporation (SABIC) 2015.
Poly(p-phenylene oxide), Wikipedia http://en.wikipedia.org/wiki/Poly(p-phenylene_oxide) (Mar. 8, 2015).

* cited by examiner

*Primary Examiner* — Vickey Nerangis
(74) *Attorney, Agent, or Firm* — Nixon & Vanderhye P.C.

(57) ABSTRACT

The present invention relates to a fuel part, comprising a polymer composition comprising: i. a polyamide A, and ii. micro talcum in an amount of 0.001 to 1 weight percent with respect to the total amount of the polymer composition, wherein the polymer composition has a melt volume flow rate (MVR) of at most 70 cm$^3$/10 min at a weight of 21.6 kg and at a temperature of T$_{measure}$ as measured according to ISO 1133. The invention also relates to a process for preparation of such fuel part wherein a blow-molding or roto-molding process is applied.

13 Claims, No Drawings

FUEL PART AND PROCESS FOR PREPARATION OF A FUEL PART

This application is the U.S. national phase of International Application No. PCT/EP2011/062546 filed 21 Jul. 2011 which designated the U.S. and claims priority to EP 10170791.7 filed 26 Jul. 2010, the entire contents of each of which are hereby incorporated by reference.

This invention relates to a fuel part comprising a polymer composition and a process for preparing such fuel part.

PRIOR ART

Fuel parts are known and for example described in EP1609595. EP1609595 describes a multilayer container which can be extruded from extruders corresponding to the number of layers to be formed. However, this has the disadvantage that the method of production is complicated. EP1241229 describes a fuel resistant polyamide, which is used to prepare a part by injection molding. EP1241229 has the disadvantage that the parts obtained do not show the desired low fuel permeability in combination with good mechanical properties.

OBJECT OF PRESENT INVENTION

It is an object of the present invention to provide fuel parts in which the fuel permeation of the polymer composition in the fuel part is further reduced and in which the mechanical properties remain sufficient, especially the thickness distribution homogeneity when the fuel part is prepared by a blow-molding process.

PRESENT INVENTION

It now has surprisingly been found that a fuel part, comprising a polymer composition comprising:
i. a polyamide, and
ii. micro talcum in an amount of 0.001 to 1 weight percent with respect to the total amount of the polymer composition, and
wherein the polymer composition has a melt volume flow rate (MVR) of at most 70 cm$^3$/10 min at a weight of 21.6 kg and at a temperature of T$_{measure}$ as measured according to ISO 1133 shows decreased fuel permeability while maintaining mechanical properties, such as cold impact strength at −30° C.

This has been exemplified in examples that are listed below.

The term "fuel" is here understood as comprising various mixtures of hydrocarbons used as fuel in internal combustion or high-compression engines. Thus, this term in particular encompasses fuel oil, diesel oil and all categories of petrol, as well as mixtures of hydrocarbons and alcohols, or the like. The fuel part according to the invention shows surprisingly low fuel permeability for ethanol containing fuels, also known as bio-fuels.

Fuel parts are here understood parts that can be in contact with fuel, such as fuel containers, fuel canisters, fuel caps, and fuel hoses. Fuel containers are herein understood means for containing fuel. Suitably, the container has one or more openings, suited for either separately or combined filling and/or releasing fuel.

The melt volume flow rate (MVR) of the polymer composition is measured according to ISO 1133 with a weight of 21.6 kg and at a certain temperature (hereafter abbreviated as T$_{measure}$). This measuring temperature is defined by the measure, melting temperature (abbreviated as T$_m$) of the polyamide A. For polyamides having a T$_m$ of at most 260° C., T$_{measure}$=T$_m$+20° C. For polyamides having a T$_m$ higher than 260° C., T$_{measure}$=T$_m$+10° C. Preferably, the MVR is at most 60 cm$^3$/10 min at a weight of 21.6 kg and at a temperature of T$_{measure}$, more preferably the MVR is at most 50 cm$^3$/10 min at a weight of 21.6 kg and at a temperature of T$_{measure}$. A lower MVR is beneficial mechanical properties, especially when the fuel part is prepared by blow-molding, as then less sagging occurs and parison strength remains sufficient. Preferably, the MVR is at least 1 cm$^3$/10 min at a weight of 21.6 kg and at a temperature of T$_{measure}$, as it is otherwise difficult to measure.

Where the polymer composition comprises more than one polyamide, T$_{measure}$ is determined by the highest melting temperature of the polyamides.

Polyamide A

Polyamide A present in the fuel part comprising a polymer composition include all semi-crystalline polyamides.

"Semi-crystalline polyamide" is here understood to encompass polyamides having crystalline and amorphous regions. Suitable polyamides include aliphatic polyamides such as PA6, PA66, PA46, PA410, PA610, PA612, PA11, PA12, PA412 as well as blends thereof, but also semi-aromatic polyamides. Suitable semi-aromatic polyamides include terephthalic acid based polyamides like PA6T, PA9T, PA4T and PA6T6I, as well as PAMXD6 and PAMXDT, and copolyamides thereof, as well as blends thereof, as well as blends of aliphatic and semi-aromatic polyamides.

Preferably, polyamide A in the polymer composition is chosen from the group of PA6, PA66 or blends thereof, as this has the advantage that these polyamides are readily available and have god base fuel permeation level coupled with good level of ductility or resistance to impact.

Preferably, the ratio of terminal carboxy group concentration over terminal amino group concentration of the polyamide A is equal to 1 or higher. This ratio of terminal carboxy group concentration over terminal amino group concentration can be expressed as:

$$([\text{terminal carboxy groups}]/[\text{terminal amino groups}]) \geq 1 \qquad \text{form. I}$$

whereby [terminal carboxy groups] is the concentration of terminal carboxy end groups in the polymer in meq/kg, and [terminal amino groups] is the concentration of terminal amino groups in the polymer in meq/kg. Terminal amino group concentration and terminal carboxy group concentration can be measured according to the method described in the examples. Preferably, the ratio of terminal carboxy group concentration over terminal amino group concentration of the polyamide A is higher than 1, more preferably at least 1.1 and even more preferred at least 1.2. This has the advantage that the thermal stability during melt processing is high.

Micro Talcum

Micro talcum present in the polymer composition preferably has a median diameter of less than 1 micrometer, more preferably less than 0.7 micrometer, even more preferred less than 0.6 micrometer. This has the advantage that the micro talcum is more effective in reducing the fuel permeation level than talcum particles with a higher median diameter. The particle size distribution of micro talcum is determined by a high speed image analyzer. This analyzer projects all particles in a limited sample into 2-dimensional images and measures the actual surface area of all captured separate particles. These surface area are subsequently recalculated into circles having the same surface area of which the diameter is calculated. The median value of the particle size distribution is then determined by known means.

Micro talcum may be present in the polymer composition in very low amounts, such as in an amount of at least 0.001 wt % with respect to the total amount of the polymer composition, preferably at least 0.01 wt %, more preferably at least 0.02 wt %, even more preferably at least 0.04 wt %, and still more preferably at least 0.05 wt %. Preferably, micro talcum may be present in the polymer composition in an amount of at most 1 wt % with respect to the total amount of the polymer composition, more preferably at most 0.5 wt %, even more preferred at most 0.2 wt % and even more preferably at most 0.1 wt %.

Amounts of micro talcum according to the invention have the advantage that the cold impact at −30° C. remains sufficient.

Polyamide B

Surprisingly, it has been shown that the further presence of a polyamide B being PA-410 in an amount of at least 0.1 wt % based on the total amount of the polymer composition in a fuel part according to the invention leads to even lower fuel permeability, as compared to fuel parts not comprising PA410. PA410 is here understood to be a polyamide containing monomer units of 1,4-diaminobutane and 1,10-decanedioic acid.

Preferably, PA-410 is present in the polymer composition in an amount of at least 0.2 wt % with respect to the total amount in the polymer composition. More preferably, the amount of PA-410 is at least 0.5 wt %, even more preferably the amount is at least 1 wt %.

Preferably, PA410 is present in an amount of at most 10 wt %.

Preferably, the polymer composition comprises a blend of PA6 and PA410 or PA66 and PA410. This has the advantage that the relative gain in fuel permeation reduction is big and the ductility of fuel part is good.

Other Additives

The fuel part according to the invention can optionally comprise other additives such as impact modifiers, fillers, rubbers, colorants, lubricants and branching agent.

Suitable fillers are mineral fillers such as clay, mica, talc, glass spheres. Reinforcing fibres are for example glass fibres. As reinforcing fibres the polyamide composition preferably comprises 5 to 60 wt % glass fibres, relative to the total amount of polymer composition, more preferably 10 to 45, and most preferably 15 to 40 wt % glass fibres. Suitable glass fibres generally have a diameter of 5-20 micron, preferably 8-15 micron, and are provided with a coating suitable for use in polyamide. An advantage of a polymer composition comprising glass fibres is its increased strength and stiffness, particularly also at higher temperatures, which allows use at temperatures up to close to the melting point of the polymer in a polymer composition.

Suitable impact modifiers are rubber-like polymers that not only contain apolar monomers such as olefins, but also polar or reactive monomers such as, among others, acrylates and epoxide, acid or anhydride containing monomers. Examples include a copolymer of ethylene with (meth) acrylic acid or an ethylene/propylene copolymer functionalized with anhydride groups. The advantage of impact modifiers is that they do not only improve the impact strength of the polymer composition but also contribute to an increase in viscosity.

Preferably the amount of impact modifiers is at least 1 wt % with respect to the total amount of the polymer composition, more preferably at least 5 wt %. This has the advantage that the impact strength is good.

Preferably, the amount of impact modifiers is at most 60 wt % with respect to the total amount of the polymer composition, more preferably at most 50 wt %. This has the advantage that the barrier properties remain sufficient. Preferably, the impact modifier is chosen from the group of maleic anhydride functionalized polyolefin.

As colorants for example carbon black or nigrosine can be employed. Preferably, the amount of extractables in a fuel part is low to avoid contamination of fuel lines and filters. Preferably, the fuel part is thus dispersant-free.

Process for Preparation of a Fuel Part

The invention also relates to a process for preparation of a fuel part. It has surprisingly been shown that the fuel part according to the invention can advantageously be prepared by the process of blow-molding or roto-molding.

Blow-molding is here understood to comprise at least the following steps:
a. heating a polymer composition to obtain a viscous liquid;
b. forming a parison from the viscous liquid;
c. expand the parison by pressurized gas and press it against a mold cavity until it cools and solidifies to form a part;
d. opening the mold;
e. ejecting the part.

The polymer composition used in step a) is the polymer composition as described in this description.

Roto-molding is here understood to comprise at least the following steps:
a. filling a mold with a polymer composition;
b. heating the mold while rotating it to a temperature at which the polymer composition melts;
c. dispersing the polymer composition to the wall of the mold;
d. sintering the polymer composition;
e. cooling the mold until the polymer composition solidifies to form a part
f. opening the mold;
g. ejecting the part.

The polymer composition in step a) is the polymer composition as described above.

Fuel parts according to the invention, prepared by the process of blow-molding or roto-molding, exhibit a good thickness distribution homogeneity, combined with low fuel permeation. Another advantage is that the mechanical properties remain sufficient, such as the cold impact strength at −30° C. and less sagging occurs and parison strength remains sufficient.

The invention will now be elucidated by examples, without the wish to be limited hereto.

EXAMPLES

Methods

The fuel permeation rate (P) was measured by the weight loss method according to ASTM E96BW in which water has been replaced by ASTM fuel CE10 (composed of 10 vol. % ethanol and 90 vol. % of ASTM fuel C (50/50 wt % mixture of toluene and iso-octane)). The fuel permeation measurements were performed at 40° C. under dry conditions. The standard deviation in this method is between 5 and 10%.

Weight percentages are denoted with respect to the total weight of the polymer composition, unless stated otherwise.

Terminal Amino Group Concentration/Terminal Carboxy Group Concentration

The carboxyl end groups were potentiometrically determined in o-cresol by means of a titration with tetrabutyl ammonium hydroxide.

The amino end groups were potentiometrically determined in phenol by means of a titration with hydrochloric acid.

Cold Impact Data

Dynatup instrumented impact was performed using the guidelines of ASTM D 3763 and ISO 6603-2. Discs (2"×⅛") were injection molded and tested −30° C. in a dry-as-molded state. The tup diameter was 0.5 inches with a lower clamp support diameter of 1.5 inches. The test speed was 6.8 ft/sec. At least five discs were tested. Discs of each material had been placed in a −30° C. freezer overnight. Test parts were transferred from the freezer to the test chamber one set at a time. The discs were tested after the chamber had equilibrated to the set temperature.

Melt Volume Flow Rate (MVR)

The MVR of the polymer composition was measured according to ISO 1133 with a weight of 21.6 kg and at a certain measuring temperature (hereafter abbreviated as $T_{measure}$). This measuring temperature is defined by the melting temperature (abbreviated as $T_m$) of the polyamide A. For polyamides having a $T_m$ of at most 260° C., $T_{measure}=T_m+20°$ C. For polyamides having a $T_m$ higher than 260° C., $T_{measure}=T_m+10°$ C.

Polyamides Used

PA6; $T_m=220°$ C. $T_{measure}=240°$ C.

Micro Talcum

Median diameter of 0.50 micrometer, 99% was less than 5 micrometer, 92% less than 2 micrometer and 75% less than 1 micrometer.

Impact Modifier

As impact modifier was used a maleic anhydride (MAH) grafted ethene copolymer.

Results

TABLE 1

Fuel permeation measurements (T = 40° C.)

| Example nr: | Polyamide A; [wt %] | Impact modifier [wt %] | MVR [cm³/10 min] | Micro talcum content [wt %] | P [gmm/m²day] | terminal end group ratio |
|---|---|---|---|---|---|---|
| C_1 | PA6 100 | 0 | >100 | 0 | 5.9 | 1.33 |
| C_2 | PA6 90.25 | 9.75 | 5 | 0 | 3.8 | 1.02 |
| I | PA6 90.25 | 9.75 | 5 | 0.05 | 2.4 | 1.02 |
| II | PA6 90.25 | 9.75 | 5 | 0.1 | 2.2 | 1.02 |

Table 1 clearly exemplifies that the combination of a MVR of at most 70 cm³/10 min and the presence of micro talcum results in a decreased fuel permeation (see Examples nr I and II), whereas an MVR of more than 70 cm³/10 min and no micro talcum present leads to higher fuel permeation (see Comparative Example C_1). In a composition where no micro talcum is present and a MVR of at most 70 cm³/10 min, the permeability is lower than in a composition with an MVR higher than 70 cm³/10 min (see C_2 compared with C_1), but still much higher than with compositions according to the invention (compare C_2 with Examples nr I and II).

Measurements on Fuel Tanks

Permeation measurements were performed on pre-soaked, sealed blow-molded tanks at 28° C. and atmospheric pressure, which were filled for at least 40 vol % of fuel CE10. The tanks were made from a polymer composition of 89 wt % PA6 with a ratio of terminal carboxy group concentration over terminal amino group concentration higher than 1, 9.75 wt % impact modifier and 0.08 wt % micro talcum. The MVR of the polymer composition was 37 cm³/10 min as measured at 275° C. at 21.6 kg. Various thicknesses were produced. The fuel permeation rate is presented in Table 2.

TABLE 2

Fuel permeation measured on fuel tanks

| Nominal wall thickness [mm] | Permeation rate [g/m2 day] |
|---|---|
| 2 | 0.19 |
| 1.8 | 0.18 |
| 1.6 | 0.18 |
| 1.4 | 0.21 |
| 1.2 | 0.5 |

The results in Table 2 clearly show that a fuel part according to the invention shows a very low permeation rate.

Measurements on Blends

Fuel permeability was also measured on blends of polyamide-6 with polyamide-410. Also here a decrease in fuel permeability was observed upon presence of micro talcum.

The invention claimed is:

1. A blow-moulded or roto-moulded fuel part, wherein the fuel part is formed of a polymer composition comprising:
   i. a polyamide A which is at least one polyamide selected from the group consisting of polyamide-6 (PA-6) and polyamide-66 (PA-66), and
   ii. an amount of 0.05 to 0.5 weight percent with respect to the total amount of the polymer composition of micro talcum having a median diameter of less than 0.6 μm, wherein
   the polymer composition has a melt volume flow rate (MVR) of at most 70 cm³/10 min at a weight of 21.6 kg and at a temperature of $T_{measure}$ as measured according to ISO 1133, and wherein
   the polyamide A has a ratio of terminal carboxy group concentration to terminal amino group concentration which is equal to or greater than 1, and wherein
   the fuel part exhibits a fuel permeation rate for a hydrocarbon fuel measured by a weight loss method according to ASTM E96BW using ASTM fuel CE10 which is at least 36% less than a comparable fuel part formed of an identical polymer composition not containing the micro talcum.

2. The fuel part according to claim 1, wherein the MVR is at most 60 cm³/10 min.

3. The fuel part according to claim 1, wherein the MVR is at most 50 cm³/10 min.

4. The fuel part according to claim 1, wherein the amount of micro talcum is between 0.05 to 0.2 weight percent with respect to the total amount of the polymer composition.

5. The fuel part according to claim 1, wherein the amount of micro talcum is between 0.05 to 0.1 weight percent with respect to the total amount of the polymer composition.

6. The fuel part according to claim 1, wherein the polymer composition further comprises a polyamide B, wherein the polyamide B is polyamide-410 (PA410) in an amount of at least 0.1 wt % based on the total amount of the polymer composition.

7. A process for preparation of a fuel part according to claim 1, wherein the process comprises forming the fuel part by blow-molding the polymer composition.

8. A fuel part which formed of a blow-moulded or roto-moulded polymer composition comprising:

i. a polyamide A which comprises at least one polyamide selected from the group consisting of polyamide polyamide-6 (PA-6) and polyamide-66 (PA-66), and ii. an amount of 0.04 to 0.2 weight percent with respect to the total amount of the polymer composition of micro talcum having a median diameter of less than 0.6 μm, wherein the polymer composition has a melt volume flow rate (MVR) of at most 70 cm$^3$/10 min at a weight of 21.6 kg and at a temperature of $T_{measure}$ as measured according to ISO 1133, and wherein the polyamide A has a ratio of terminal carboxy group concentration to terminal amino group concentration which is equal to or greater than 1, wherein the fuel part exhibits a fuel permeation rate (P) of 2.4 gmm/m$^2$day or less measured according to ASTM E96BW using ASTM fuel CE10.

9. The fuel part according to claim 8, further comprising a blend of the polyamide A with a polyamide B, wherein the polyamide B is polyamide-410 (PA-410).

10. The fuel part according to claim 9, wherein the polyamide B is present in an amount of at least 0.1 wt % based on the total amount of the polymer composition.

11. The fuel part according to claim 8, wherein the MVR is at most 60 cm$^3$/10 min.

12. The fuel part according to claim 8, wherein the MVR is at most 50 cm$^3$/10 min.

13. A process for preparation of a fuel part according to claim 8, wherein the process comprises forming the fuel part by blow-molding the polymer composition.

* * * * *